(12) United States Patent
Saito et al.

(10) Patent No.: US 11,403,770 B2
(45) Date of Patent: Aug. 2, 2022

(54) ROAD SURFACE AREA DETECTION DEVICE

(71) Applicant: Clarion Co., Ltd., Saitama (JP)

(72) Inventors: Tsukasa Saito, Saitama (JP); Manabu Kawabe, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 170 days.

(21) Appl. No.: 16/762,335

(22) PCT Filed: Jun. 19, 2018

(86) PCT No.: PCT/JP2018/023262
§ 371 (c)(1),
(2) Date: May 7, 2020

(87) PCT Pub. No.: WO2019/092913
PCT Pub. Date: May 16, 2019

(65) Prior Publication Data
US 2020/0265588 A1    Aug. 20, 2020

(30) Foreign Application Priority Data

Nov. 8, 2017    (JP) .............................. JP2017-215363

(51) Int. Cl.
*G06T 7/246* (2017.01)
*G06V 20/56* (2022.01)
(Continued)

(52) U.S. Cl.
CPC ............ *G06T 7/246* (2017.01); *G01B 11/285* (2013.01); *G01P 3/38* (2013.01); *G06T 2207/30256* (2013.01)

(58) Field of Classification Search
USPC ................................................ 382/103, 104
See application file for complete search history.

(56) References Cited

U.S. PATENT DOCUMENTS

| 7,792,327 B2 * | 9/2010 | Fujimoto | G06K 9/00798 |
| | | | 382/104 |
| 8,099,213 B2 * | 1/2012 | Zhang | G01S 7/4802 |
| | | | 701/41 |

(Continued)

FOREIGN PATENT DOCUMENTS

| EP | 1 796 042 | 6/2007 |
| EP | 2 128 821 | 12/2009 |

(Continued)

OTHER PUBLICATIONS

International Search Report dated Sep. 18, 2018 in International (PCT) Application No. PCT/JP2018/023262.

(Continued)

*Primary Examiner* — Ishrat I Sherali
(74) *Attorney, Agent, or Firm* — Wenderoth, Lind & Ponack, L.L.P.

(57) ABSTRACT

A road surface area detection device includes a normalized speed calculation portion configured to calculate a normalized speed based on a movement of a feature point in an image captured by a camera that is disposed in a vehicle; a determination range calculation portion configured to calculate a road surface determination range, which is indicated by a magnitude of the normalized speed, based on the normalized speeds of at least two feature points at different positions in a width direction of the vehicle in a predetermined central area where the vehicle is positioned in a center thereof in the width direction perpendicular to a vehicle traveling direction; and a road surface area identification portion configured to identify, as a road surface area on which the vehicle travels, a position in the width direction that includes the feature point whose normalized speed is within the road surface determination range.

6 Claims, 8 Drawing Sheets

(51) Int. Cl.
*G01B 11/28* (2006.01)
*G01P 3/38* (2006.01)

(56) References Cited

U.S. PATENT DOCUMENTS

| | | | | |
|---|---|---|---|---|
| 8,184,857 | B2 * | 5/2012 | Akita | G06T 7/269 |
| | | | | 382/103 |
| 8,289,391 | B2 * | 10/2012 | Kiyohara | G06K 9/342 |
| | | | | 348/148 |
| 8,634,593 | B2 * | 1/2014 | Zhang | G06K 9/4652 |
| | | | | 382/104 |
| 9,242,601 | B2 * | 1/2016 | You | G06K 9/4647 |
| 9,536,155 | B2 * | 1/2017 | Takemae | B60R 1/00 |
| 10,115,024 | B2 * | 10/2018 | Stein | G06K 9/00791 |
| 10,623,716 | B2 * | 4/2020 | Retterath | H04N 13/204 |
| 10,650,271 | B2 * | 5/2020 | Nakata | G06K 9/00979 |
| 2007/0127777 | A1 * | 6/2007 | Fujimoto | G06K 9/00798 |
| | | | | 382/104 |
| 2010/0027844 | A1 | 2/2010 | Akita | |
| 2011/0074957 | A1 | 3/2011 | Kiyohara et al. | |
| 2017/0262734 | A1 | 9/2017 | Nakata et al. | |
| 2019/0001910 | A1 | 1/2019 | Motohashi | |

FOREIGN PATENT DOCUMENTS

| | | |
|---|---|---|
| EP | 2 312 497 | 4/2011 |
| EP | 2 741 233 | 6/2011 |
| EP | 3 428 902 | 1/2019 |
| JP | 2008-3696 | 1/2008 |
| JP | 2011-77772 | 4/2011 |
| JP | 2014-110059 | 6/2014 |

OTHER PUBLICATIONS

Koichiro Yamaguchi et al., "Obstacle Detection in Road Scene using Monocular Camera", IPSJ SIG Technical Report, 2005-CVIM-151, Nov. 18, 2005, vol. 2005, No. 112, pp. 69-76.

* cited by examiner

FIG.2
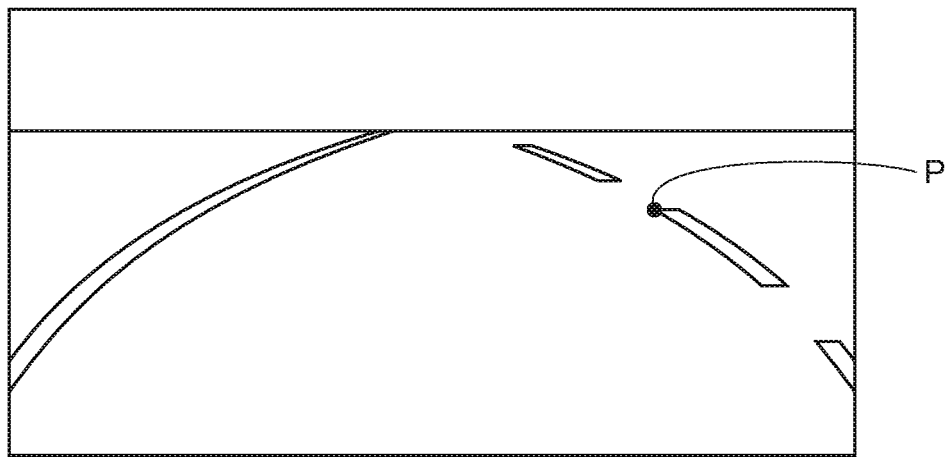
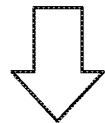
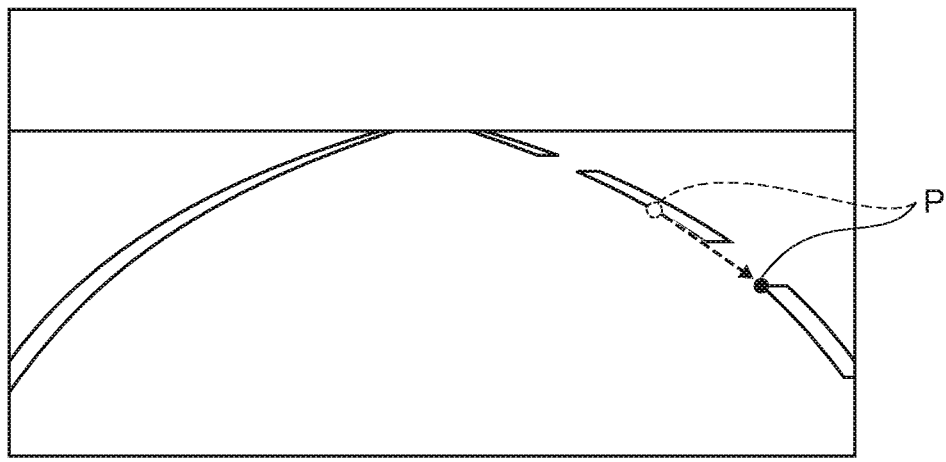

ROAD SURFACE AREA DETECTION DEVICE

CROSS-REFERENCE TO RELATED APPLICATION

This application is based upon and claims the benefit of priority from Japanese Patent Application No. 2017-215363 filed on Nov. 8, 2017, the entire disclosure of which is incorporated herein by reference.

TECHNICAL FIELD

A present disclosure relates to a road surface area detection device that detects a road surface area.

BACKGROUND ART

A road surface detection device is installed in a vehicle to detect a road surface (see Patent Literature 1: JP 2014-110059A, for example). The road surface detection device detects the road surface by obtaining a V-disparity map based on images and the like from a binocular camera or the like, extracting a line segment from the V-disparity map as the road surface, and estimating a road line segment.

However, the road surface detection device described above uses the binocular camera, a stereo camera, a multiple-lens camera or the like. Accordingly, it is necessary to install such an element in the vehicle for the detection.

The present disclosure is made considering the above issue, and an object of the present disclosure is to provide a road surface area detection device that can detect a road surface area with a simple configuration.

SUMMARY OF THE INVENTION

To achieve the above object, a road surface area detection device according to the present disclosure includes a normalized speed calculation portion configured to calculate a normalized speed based on a movement of a feature point in an image captured by a camera that is disposed in a vehicle, a determination range calculation portion configured to calculate a road surface determination range that is indicated by a magnitude of the normalized speed based on normalized speeds of at least two feature points at different positions in a width direction of the vehicle in a predetermined central area where the vehicle is positioned in a center thereof in the width direction, and a road surface area identification portion configured to identify, as a road surface area on which the vehicle travels, a position in the width direction that includes the feature point whose normalized speed is within the road surface determination range.

BRIEF DESCRIPTION OF DRAWINGS

FIG. 2 is an explanatory view illustrating tracking of a feature point extracted from an images captured by a camera.

DETAILED DESCRIPTION OF THE INVENTION

Hereinafter, a road surface area detection device 10 according to a first embodiment which is an example of a road surface area detection device according to the present disclosure will be described with reference to the accompanying drawings.

First Embodiment

A road surface area detection device 10 according to the first embodiment of the present disclosure will be described with reference to FIG. 1 to FIG. 9. The road surface area detection device 10 is configured to detect, as a road surface area Ar, a road surface on which a vehicle 1 is traveling (see FIG. 3, etc.) and a flat area continuous to the road surface at the same height position as the road surface (see FIG. 7, etc.). Here, a direction to which the vehicle 1 travels is defined as a traveling direction Dm and a direction perpendicular to the traveling direction Dm is defined as a width direction Dw (see FIG. 3, etc.).

Figure 1:
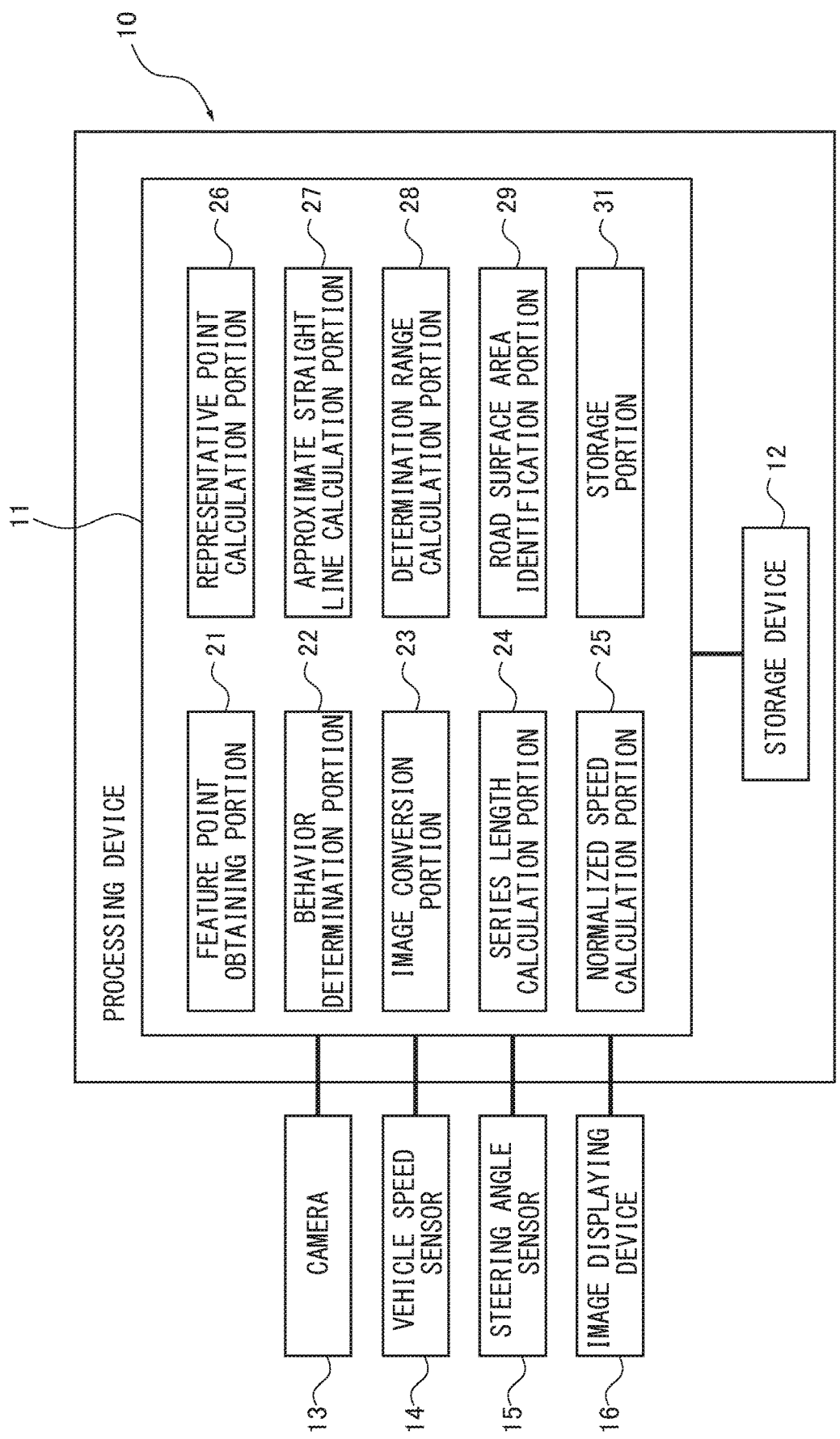
FIG. 1 is a block diagram illustrating a configuration of a road surface area detection device according to a first embodiment which is an example of a road surface area detection device according to the present disclosure.

As shown in FIG. 1, the road surface area detection device 10 includes a processing device 11 and a storage device 12. To the processing device 11, a camera 13, a vehicle speed sensor 14, a steering angle sensor 15, and an image displaying device 16 are connected via an in-vehicle network such as CAN (Controller Area Network) as a communication protocol.

The camera 13 is configured to obtain images within a predetermined range in the width direction Dw around the vehicle 1. In the first embodiment, the camera 13 is provided in the front portion of the vehicle 1. The camera 13 includes a single wide-angle fisheye lens to obtain images in front of the vehicle 1 within a wide range in the width direction Dw. In the first embodiment, the camera 13 is one of cameras disposed in the vehicle 1. In addition to the camera 13 provided in the front portion of the vehicle 1, other cameras are provided in rear, left and right portions of the vehicle 1. These cameras are used to obtain the image of the entire circumference of the vehicle 1 and generate an overhead image (or a bird's-eye view image). The camera 13 outputs the obtained image (image data) to the processing device 11. It should be noted that the camera 13 is not limited to the one in the first embodiment as long as the camera can obtain images within a predetermined range in the width direction Dw around the vehicle 1. For example, a camera with a different configuration, a rear camera to obtain images rearward of the vehicle 1, or a plurality of cameras may be used.

The vehicle speed sensor 14 is configured to detect the speed of the vehicle 1 and output the detected vehicle speed (vehicle speed data) to the processing device 11. The steering angle sensor 15 is configured to detect the steering angle of the vehicle 1 and output the detected steering angle (steering angle data) to the processing device 11. The image displaying device 16 is configured to display images or the like captured by the camera 13 and processed by the processing device 11. The image displaying device 16 is capable of displaying the overhead image (see FIG. 3, etc.) generated by the processing device 11 (an image conversion portion 23 which will be described below).

The storage device 12 stores in advance a program for identifying the road surface area Ar, a program for generating the overhead image, and information that is required to the programs and can be used without rewriting, for example. The stored programs and information in the storage device 12 are readable by the processing device 11.

The processing device (processor) 11 is configured to receive information from the camera 13, the vehicle speed sensor 14, and the steering angle sensor 15 and collectively execute a road surface identification process to identify the road surface area Ar, an overhead image generation process to generate the overhead image, a calibration process for the camera 13, and the like in accordance with the programs stored in the storage device 12. Further, the processing device 11 controls the image displaying device 16 to display the identified road surface area Ar, the generated overhead image and the like.

The processing device (processor) 11 includes a feature point obtaining portion 21, a behavior determination portion 22, the image conversion portion 23, a series length calculation portion 24, a normalized speed calculation portion 25, a representative point calculation portion 26, an approximate straight line calculation portion 27, a determination range calculation portion 28, a road surface area identification portion 29, and a storage portion 31. The above-listed portions except for the storage portion 31 consist of programs. It should be noted that the above-listed portions are not limited to the configurations in the first embodiment and may be configured exclusively by electronic circuits. In the storage portion 31, numerical data required in the calculation processes in the portions of the processing device 11, program variables for the processing results during the calculation processes, and the like are written, which are read by the corresponding portions of the processing device 11. The storage portion 31 may store programs for all of the processes executed by the processing device 11.

The feature point obtaining portion 21 is configured to extract a feature point P (see FIG. 2, etc.) from the image when the image (image data) is input from the camera 13. The feature point P is a coordinate point corresponding to the position of a specific object. The specific object may be a location with a high edge strength in the image (an $N^{th}$ frame), such as a corner of a white line or a road sign on the road. For example, the feature point obtaining portion 21 detects, as the feature point P, the corner of the white line in the $N^{th}$ frame captured by the camera 13 as shown in an upper view of FIG. 2, The feature point P may be extracted by using a known feature point extraction methods such as the Harris operator, for example.

In addition, the feature point obtaining portion 21 tracks the extracted feature point P. Specifically, the feature point obtaining portion 21 detects where the feature point P extracted in the $N^{th}$ frame is located in a next frame ($N+1^{th}$ frame). For example, as shown in a bottom view of FIG. 2, the feature point obtaining portion 21 detects where the feature point P extracted in the $N^{th}$ frame captured by the camera 13 is located in the $N+1^{th}$ frame. The feature point P may be tracked by using a known feature point tracking methods such as the LK (Lucas-Kanade) method, for example. The feature point obtaining portion 21 tracks the feature point P not only between the two consecutive frames as shown in FIG. 2 but also in other frames after the consecutive two frames as much as possible.

FIG. 2 shows only one feature point P detected in the single frame (image) to facilitate understanding of the present disclosure. However, a plurality (hundreds) of feature points P may be extracted in the single frame and so there may be a plurality of tracking results. The feature point obtaining portion 21 stores, as a series of the feature points P (i.e. a feature point series Ps) in the storage portion 31, a coordinate position of the extracted feature point P in the $N^{th}$ frame and a coordinate position of the feature point P in the $N+1^{th}$ frame which is the tracking result of the feature point P from the $N^{th}$ frame (also coordinate positions of the feature point P in frames after $N+2^{th}$ frame in a case that there are a plurality of tracking results).

The behavior determination portion 22 is configured to determine whether the behavior of the vehicle 1 is in a condition suitable for the identification of the road surface area Ar in accordance with the vehicle speed (the vehicle speed data) and the steering angle (the steering angle data) input from the vehicle speed sensor 14 and the steering angle sensor 15. The behavior determination portion 22 determines that the behavior of the vehicle 1 is in the condition suitable for the identification of the road surface area Ar when the variation of the vehicle speed and the steering angle of the vehicle 1 are within predetermined ranges, respectively. The above determination is made because of the following reason. A large variation of the vehicle speed causes changes in the attitude of the vehicle 1. Accordingly, the accuracy of the extraction results and tracking results of the feature point P by the feature point obtaining portion 21 may be reduced. In addition, a large variation of the vehicle speed may reduce the accuracy of the calculation result of the distance that the vehicle 1 has traveled during the tracking of the extracted feature point P even by using the detection result from the vehicle speed sensor 14. These results are used for the calculation of a normalized speed nv, which will be described below and accordingly, the accuracy of the normalized speed nv may also be reduced. In addition, a large steering angle makes the tracking of the extracted feature point P difficult. Considering the above, in the first embodiment, it is determined that the vehicle 1 is in the condition suitable for identifying the road surface area Ar if it can be considered that the vehicle 1 is traveling straight at a substantially constant speed.

Figure 3:
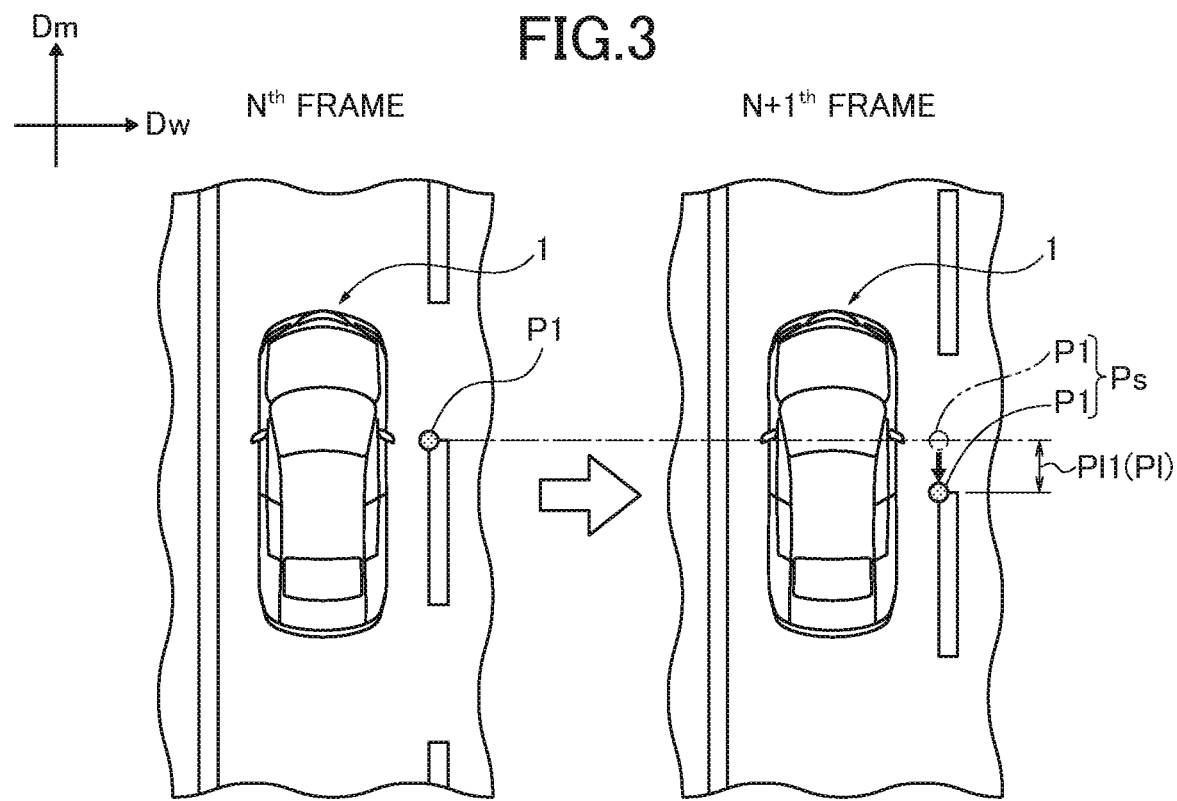
FIG. 3 is an explanatory view illustrating an example of an obtained feature point series.

When the image (image data (see FIG. 2)) is input from the camera 13, the image conversion portion 23 converts the viewpoint of the image and generates the overhead image see FIG. 3, etc.) which is an image looking down on the ground from above (the overhead image generation process). Further, the image conversion portion 23 obtains, from the storage device 12, design values of angles (a pitch angle, a yaw angle, a roll angle) and an installation position (a camera height) of the camera 13 (external parameters) as well as camera parameters (internal parameters) such as a distortion function, an optical axis center, a pixel size and a focal length of the camera 13. Also, the image conversion portion 23 executes a distortion correction process for correcting an image distortion caused by the lens using the obtained distortion function. In addition, the image conversion portion 23 generates output values (luminance values of respective colors) of pixels at all coordinate positions in the overhead view image represented by a world coordinate system based on the output values (luminance value of respective colors) of the corresponding pixels of a distortion-corrected image by using a well-known camera geometric transformation formula. If there are no pixels in the distortion-corrected image corresponding to specific pixels in the overhead image, the image conversion portion 23 obtains the output value of the specific pixels based on the luminance values of peripheral pixels in the distortion-corrected image by a known luminance interpolation process. Moreover, the image conversion portion 23 generates the overhead image surrounding the vehicle 1 by naturally connecting adjacent images captured by the four cameras including the camera 13 as an image while eliminating the unnaturalness in the connected portions of the images by the linear interpolation of the brightness of the corresponding coordinate values or the like. It should be noted that the image conversion portion 23 is not limited to the one in the first embodiment. The image conversion portion 23 may simultaneously execute the above processes or other processes as long as generating the overhead image (its image data).

In addition, the image conversion portion 23 converts the coordinates of the feature point series Ps (the extraction result and the tracking result of the feature point P) detected by the feature point obtaining portion 21 and stored in the storage portion 31 to the world coordinates and then stores the converted world coordinates in the storage portion 31. Specifically, the image conversion portion 23 converts the coordinates of the feature point series Ps (the coordinate positions indicating the track of the feature point P (see FIG. 2)) extracted at the coordinate positions in the images from the camera 13 to the coordinate positions in the overhead image (see FIG. 3, etc.). The conversion of the coordinate positions of the extraction result and tracking result of the feature point P may be executed by the feature point obtaining portion 21 or the series length calculation portion 24.

The series length calculation portion 24 calculates, as a feature point series length Pl, a length of the feature point series Ps which corresponds to a straight line formed by displacement of the same feature point P, i.e. the moving amount of the feature point P. The series length calculation portion 24 calculates the feature point series length Pl based on the extraction result and the tracking result of the same feature point P converted to the world coordinates, that is, based on a change in the coordinate positions. For example, with the example of the extracted feature point P in FIG. 2, the feature point P1 is detected in the overhead image in the $N^{th}$ frame as shown on the left side in FIG. 3 and the feature point P1 is displaced in the overhead image in the $N+1^{th}$ frame as shown on the right side in FIG. 3. The length of the straight line connecting the coordinate positions of the feature point P1 in the two frames is set as a feature point series length Pl1. The feature point series length Pl1 is equal to the distance that the feature point P is actually displaced or moved (relative to the vehicle) since the length in the overhead image corresponds to the length in the world coordinate system.

Figure 4:
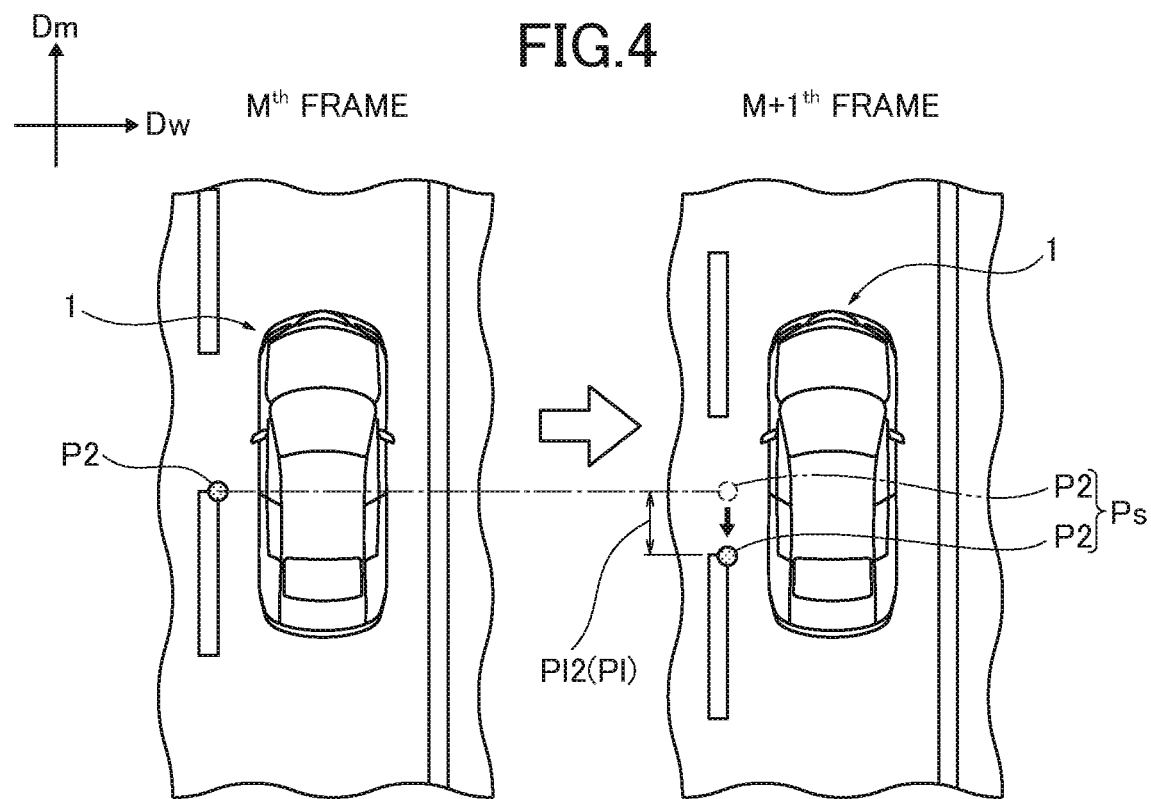
FIG. 4 is an explanatory view illustrating another example of the obtained feature point series.

Even if the feature point series length Pl is similarly calculated from the two consecutive frames, the feature point series length Pl may differ from the one described above in the case that the speed of the vehicle 1 or the height position of the feature point P is different from those in the above example. FIG. 4 shows a different example. Assuming that the feature point P2 detected in the overhead image in an $M^{th}$ frame shown on the left side in FIG. 4 has been displaced in the overhead image in an $M+1^{th}$ frame as shown on the right side in FIG. 4, the feature point series length Pl2 is calculated as a length of a straight line connecting the coordinate positions of the feature point P2 in the frames. Though the width directional position of the feature point P2 with respect to the white line is different from that of the feature point P1, the feature point P2 is also used to detect the white line on the road surface on which the vehicle 1 is traveling, similarly to the feature point P1 shown in FIG. 3. Also, the speed of the vehicle 1 shown in FIG. 4 is different from that of the vehicle 1 shown in FIG. 3.

Figure 5:
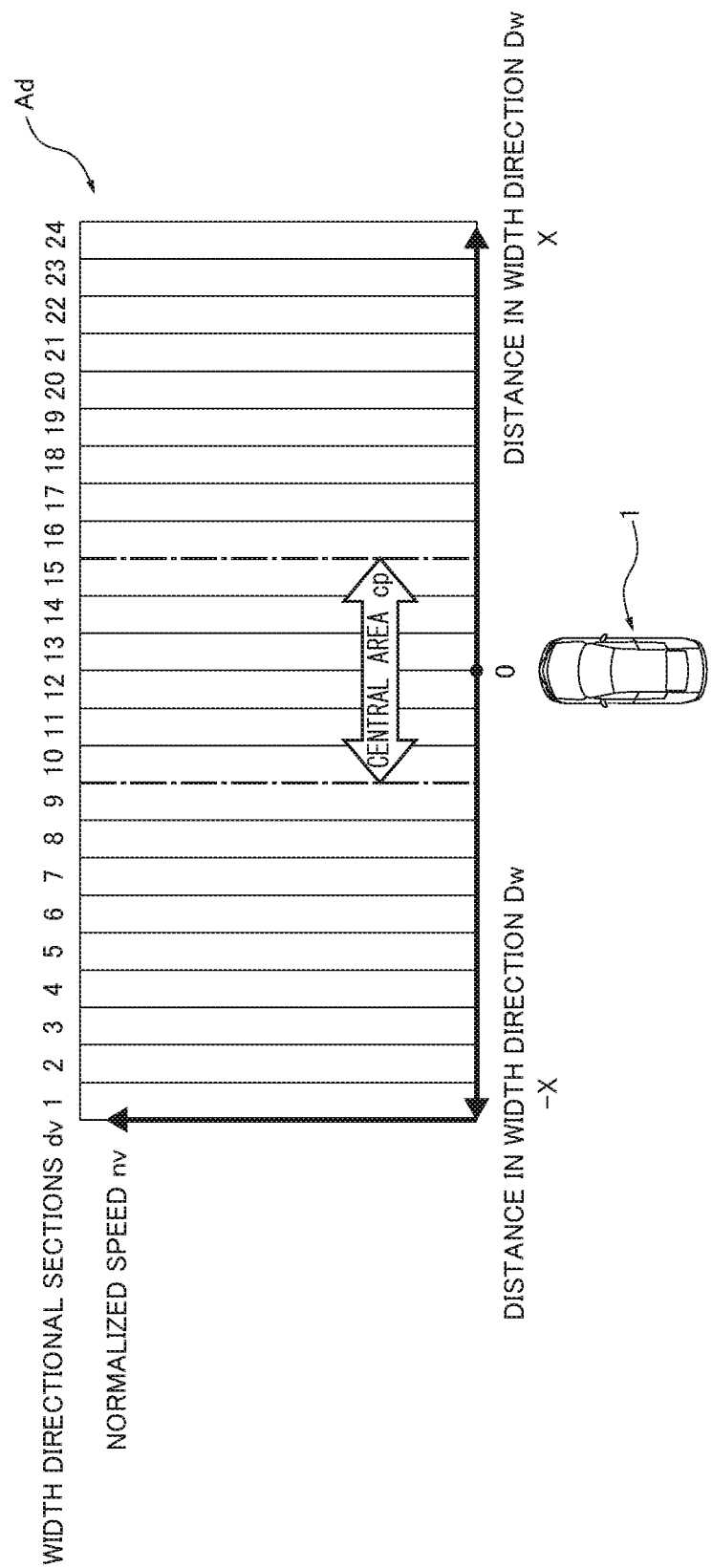
FIG. 5 is a graph illustrating the distribution of representative points, in which a horizontal axis represents a distance in a width direction where a vehicle is located in the center thereof, and a vertical axis represents the magnitude of a normalized speed.

In the first embodiment, the series length calculation portion 24 collects (accumulates) the feature point series length Pl calculated for each of width directional sections dv to which the feature point P belongs (see FIG. 5). The road surface area detection device 10 detects the road surface area Ar from a detection area Ad, and the detection area Ad is divided in the width direction Dw into a plurality of width directional sections dv each having a predetermined size. The vehicle 1 is positioned in the center of the width direction. In the first embodiment shown in FIG. 5, the detection area Ad is divided into twenty-four sections in the width direction Dw, each section having a width of one meter. The distribution graph shown in FIG. 5 illustrates the distribution of representative points Rv (the normalized speeds nv), which will be described later. In this graph, a horizontal axis represents a distance in the width direction Dw and a vertical axis represents the magnitude of the normalized speed n v. Hereinafter, when individually describing the width directional sections dv, the numbers from 1 to 24 are added to "n" of the $n^{th}$ width directional section dv in order from left to right in FIG. 5. In the first embodiment, a twelfth width directional section dv and a thirteenth width directional section dv are positions or areas on which the vehicle 1 travels. In the detection area Ad, the plurality of width directional sections dv including the twelfth width directional section dv and the thirteenth width directional section dv in the center thereof are set as a central area cp. The central area cp is set to areas in which many feature points P (specific feature objects) are expected to be detected. In the first embodiment, the central area cp is set to an area from a tenth width directional section dv to a fifteenth width directional section dv. In other words, the central area cp is set to the area of six meters where the vehicle 1 is positioned in the center thereof, for example. It should be noted that the size of each width directional section dv and the range of the central area cp (i.e. the number of the width directional sections dv) are not limited to the ones in the first embodiment and may be set as desired.

The series length calculation portion 24 stores the calculated feature point series lengths Pl in the storage portion 31 by relating each of the feature point series lengths Pl to the corresponding width directional section dv including the feature point P that is an object for each of the feature point series lengths Pl. Since the extraction result and tracking result are converted to the coordinate positions in the overhead image by the image conversion portion 23, the width directional sections dv including the feature points P can be identified from the coordinate positions in the width direction Dw.

The normalized speed calculation portion 25 calculates the normalized speed nv by normalizing the moving speed in each of the feature points P in the series of images. In the first embodiment, the normalized speed calculation portion 25 divides the feature point series length Pl calculated by the series length calculation portion 24 by the distance that the vehicle 1 has traveled while the feature point series length Pl is being set, and then sets the obtained result as the normalized speed nv. The normalized speed nv represents a ratio of the feature point series length Pl (the moving distance (relative speed) of the feature point P) to the moving distance (speed) of the vehicle 1, which makes it possible to compare differences in the moving amounts of the feature points P including differences in the height positions of the feature points P with respect to the road surface. This is based on a fact that the moving amounts of the feature points P in the same image are different between the case where the feature points P are the same height position as the road surface and the case where the feature points P are not at the same height position as the road surface even if the moving amounts of the vehicle 1 are the same.

The moving distance of the vehicle 1 is calculated based on a time for the camera 13 obtaining images in the consecutive frames, which are used for the calculation of the feature point series length Pl and the speed of the vehicle 1 detected by the vehicle speed sensor 14 while the camera 13 obtains the images. It should be noted that the calculation of the moving distance of the vehicle 1 is not limited to the one used in the first embodiment and may be carried out by using information from a wheel speed sensor provided in the vehicle 1 or other methods. The moving amount of the feature point P is equal to the moving amount of the vehicle 1 when the feature point P is located at the same height as the road surface on which the vehicle 1 travels. On the other hand, the difference between the moving amount of the feature point P and the moving amount of the vehicle 1 increases when the difference between the height of the feature point P and the height of the road surface increases. Therefore, the normalized speed nv is theoretically "1" when the target feature point P is located at the same height as the road surface. The normalized speed calculation portion 25 relates each of the calculated normalized speeds nv to the corresponding width directional section dv where the target feature point P is located and stores the related normalized speeds nv in the storage portion 31.

The representative point calculation portion 26 calculates a representative point Rv which is an average of the plurality of the normalized speeds nv in each of the width directional sections dv. In the first embodiment, the representative point calculation portion 26 does not simply calculate the average but calculates the representative point Rv as follows. First, the representative point calculation portion 26 calculates a standard deviation $\alpha 1$ and an average av1 of all of the normalized speeds nv in the target width directional section dv. Then, the representative point calculation portion 26 extracts the normalized speeds nv (hereinafter referred to as the normalized speeds nv$\alpha$) which is within a predetermined value from all of the normalized speeds nv in the target width directional section dv. The predetermined value is obtained by adding or subtracting a value obtained by multiplying the average av1 by three times the standard deviation $\alpha 1$ (av1±3$\sigma 1$). Then, the representative point calculation portion 26 calculates an average av2 of all of the normalized speeds nv$\alpha$ and sets the average av2 as the representative point Rv in the target width directional section dv. The representative point calculation portion 26 in the first embodiment sets, as the representative point Rv, the average obtained by excluding the normalized speeds nv having values significantly different from all of the calculated normalized speeds nv in the target width directional section dv. Accordingly, the representative point Rv can be calculated by excluding relatively large errors which occur during the extraction and tracking of the feature point P, the detection of the moving amount of the vehicle 1 and the like so that the representative point Rv can be obtained more accurately. The representative point calculation portion 26 sets the normalized speed nv as the representative point Rv when only one normalized speed nv presents in the target width directional section dv. The representative point calculation portion 26 relates each of the calculated representative points Rv to the corresponding width directional section dv and stores the related representative points Rv in the storage portion 31.

Figure 6:
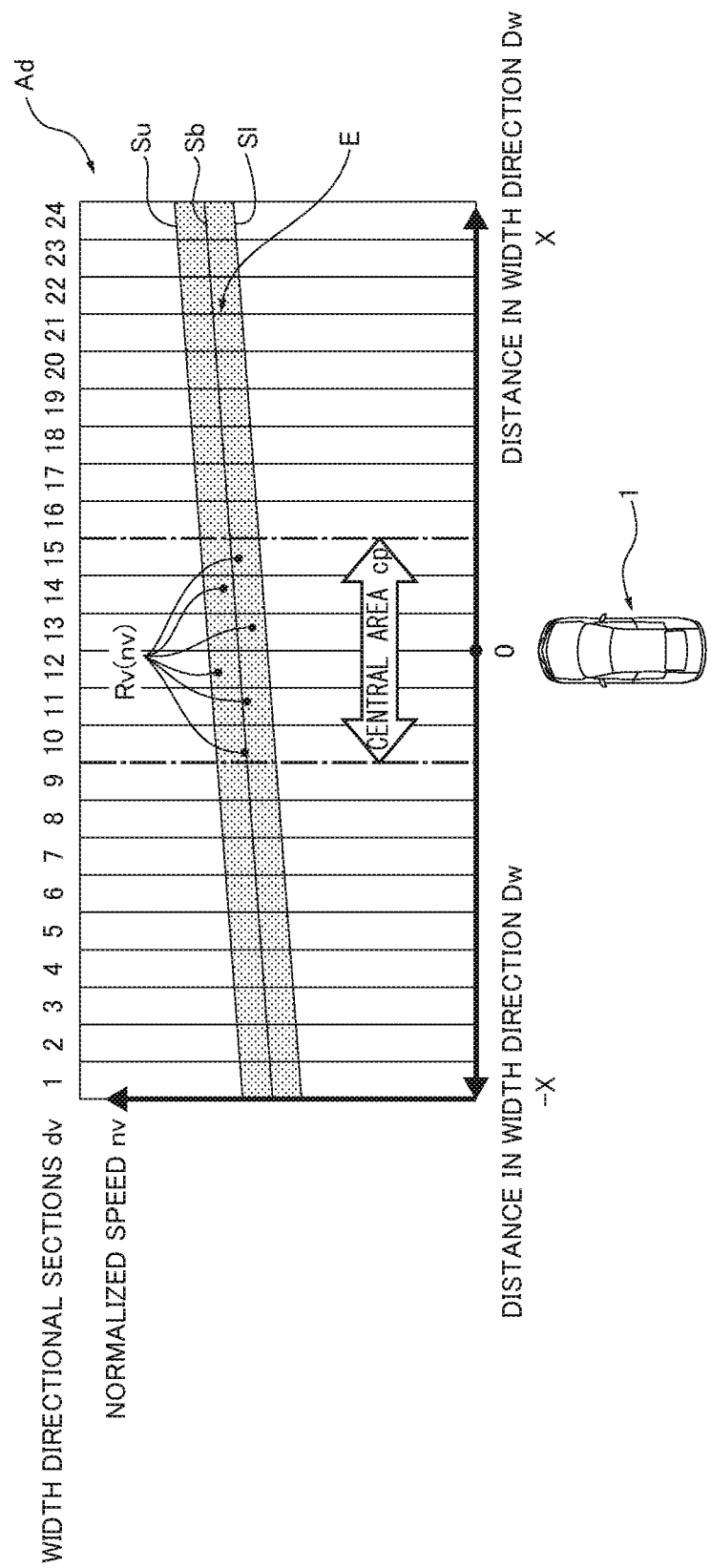
FIG. 6 is an explanatory view illustrating a road surface determination reference line, a road surface determination upper limit line, and a road surface determination lower limit line which are calculated in a graph similar to the one shown in FIG. 5.
Figure 7:
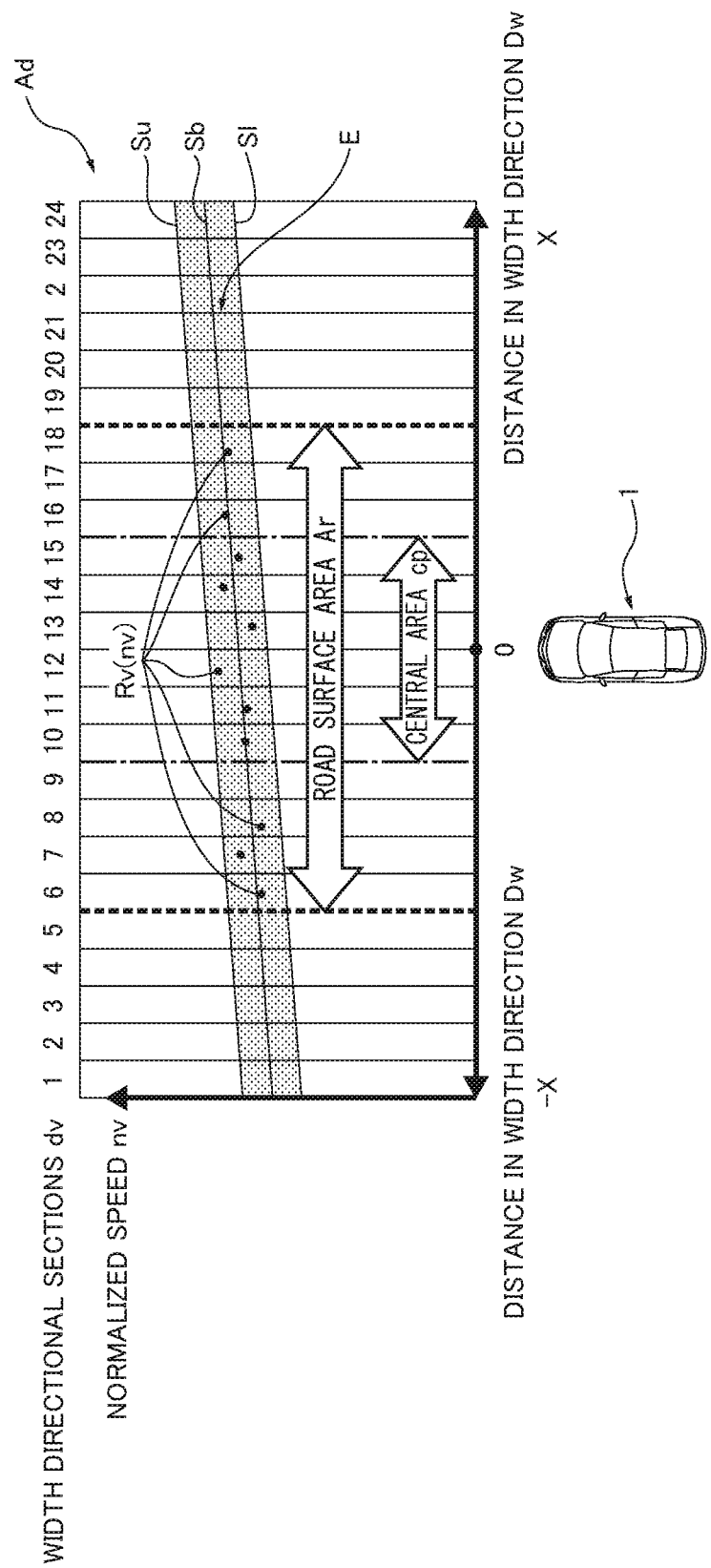
FIG. 7 is an explanatory view illustrating an example of the detection of the road surface area.
Figure 8:
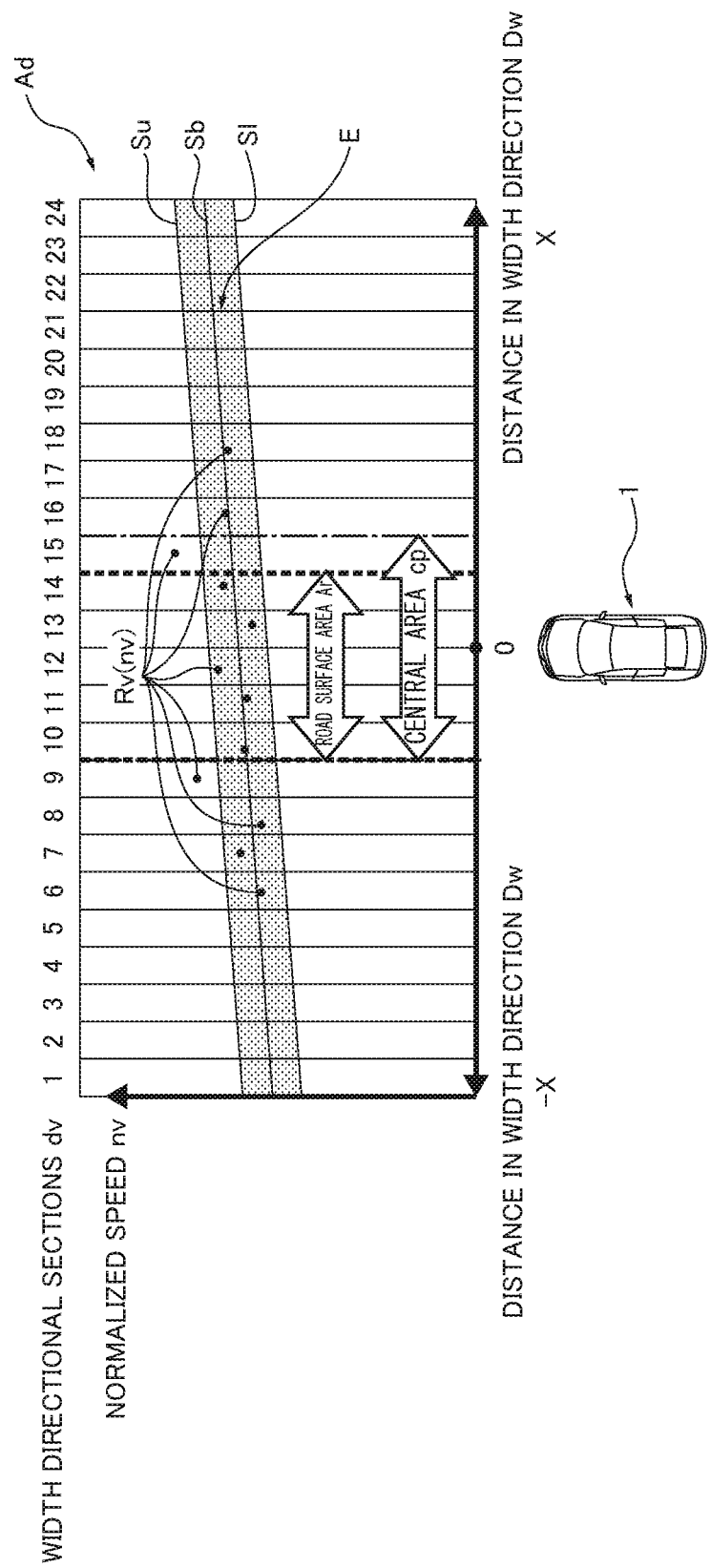
FIG. 8 is an explanatory view illustrating another example of the detection of the road surface area.

As shown in FIG. 6, the approximate straight line calculation portion 27 calculates an approximate straight line connecting the representative points Rv in the width directional sections dv (from the tenth width directional section dv to the fifteenth width directional section dv in the first embodiment) in the central area cp and then sets the calculated approximate straight line as a road surface determination reference line Sb. In the case where the representative points Rv are calculated in only two width directional sections dv in the central area cp, the approximate straight line calculation portion 27 sets a straight line connecting the two representative points Rv as the road surface determination reference line Sb. The approximate straight line calculation portion 27 stores the calculated road surface determination reference line Sb in the storage portion 31.

The determination range calculation portion 28 calculates a road surface determination range E (an area shown with dots in FIG. 6) which is indicated by the magnitude of the normalized speed nv to determine whether each of the width directional sections dv is included in the road surface area Ar or not. In the first embodiment, the determination range calculation portion 28 calculates a road surface determination upper limit line Su and a road surface determination lower limit line Sl in the distribution graph shown in FIG. 6. The road surface determination upper limit line Su is a line moved parallel by $\Delta$nv from the road surface determination reference line Sb calculated by the approximate straight line calculation portion 27 while the road surface determination lower limit line Sl is a line moved parallel by $-\Delta$nv from the road surface determination reference line Sb in the distribution graph shown in FIG. 6. The value "$\Delta$nv" is set based on a verification experiment in the first embodiment but may be set as desired. The value "$\Delta$nv" may be set by a user of the road surface area detection device 10. The determination range calculation portion 28 stores an area defined between the road surface determination upper limit line Su and the road surface determination lower limit line Sl as the road surface determination range E in the storage portion 31.

The road surface area identification portion 29 determines whether the width directional sections dv are included in the road surface area Ar (see FIG. 7, etc.) or not by determining Whether the representative points Rv present in the road surface determination range E calculated by the determination range calculation portion 28. The road surface area identification portion 29 basically identifies, as the road surface area Ar, the width directional sections dv including the representative points Rv within the road surface determination range E among the representative points Rv in all of the width directional sections dv including the central area cp. Specifically, in the example shown in FIG. 7, the farthest position (outer position) on the left side of the vehicle 1 including the representative point Rv within the road surface determination range E is a sixth width directional section dv while the farthest position (outer position)

on the right side of the vehicle 1 including the representative point Rv within the road surface determination range E is an eighteenth width directional section dv. Accordingly, the road surface area identification portion 29 identifies an area between the sixth width directional section dv and the eighteenth width directional section dv as the road surface area Ar.

The road surface area identification portion 29 according to the first embodiment changes target sections for determining whether the representative points Rv present within the road surface determination range E outwardly from the width directional sections dv adjacent to the outside of the twelfth width directional section dv and the thirteenth width directional section dv where the vehicle 1 is located. Specifically, the road surface area identification portion 29 first sets an eleventh width directional section dv and a fourteenth width directional section dv as determination target sections and then sets the tenth width directional section dv and the fifteenth width directional section dv as the next determination target sections. The road surface area identification portion 29 continues changing the determination target sections thereafter as described above. Upon detecting the width directional sections dv where the representative points Rv do not present within the road surface determination range E, the road surface area identification portion 29 identifies up to the width directional sections dv adjacent inside of the width directional sections dv where the representative points Rv do not present within the road surface determination range E as the road surface area Ar. Specifically, in the example shown in FIG. 8, on the left side of the vehicle 1, the representative points Rv present within the road surface determination range E in the tenth and eleventh width directional sections dv while the representative point Rv in a ninth width directional section dv does not present within the road surface determination range E. On the other hand, on the right side of the vehicle 1, the representative points Rv present within the road surface determination range E in the thirteenth and fourteenth width directional sections dv while the representative point Rv in the fifteenth width directional section dv does not present within the road surface determination range E. In this case, the road surface area identification portion 29 identifies an area between the tenth width directional section dv and the fourteenth width directional section dv as the road surface area Ar. In this way, the road surface area identification portion 29 identifies, as the road surface area Ar, the width directional sections dv including the feature points P located closer to the vehicle 1 than the feature points P located closest to the vehicle 1 in the width direction Dw among the feature points P whose representative points Rv (normalized speeds nv) are outside the road surface determination range E. The twelfth width directional section dv and the thirteenth width directional section dv correspond to the road surface on which the vehicle 1 is traveling so that the representative points Rv of these width directional sections dv present within the road surface determination range E and are included in the road surface area Ar. Therefore, it is not necessary to determine whether the representative points Rv present within the road surface determination range in these width directional sections dv.

Figure 9:
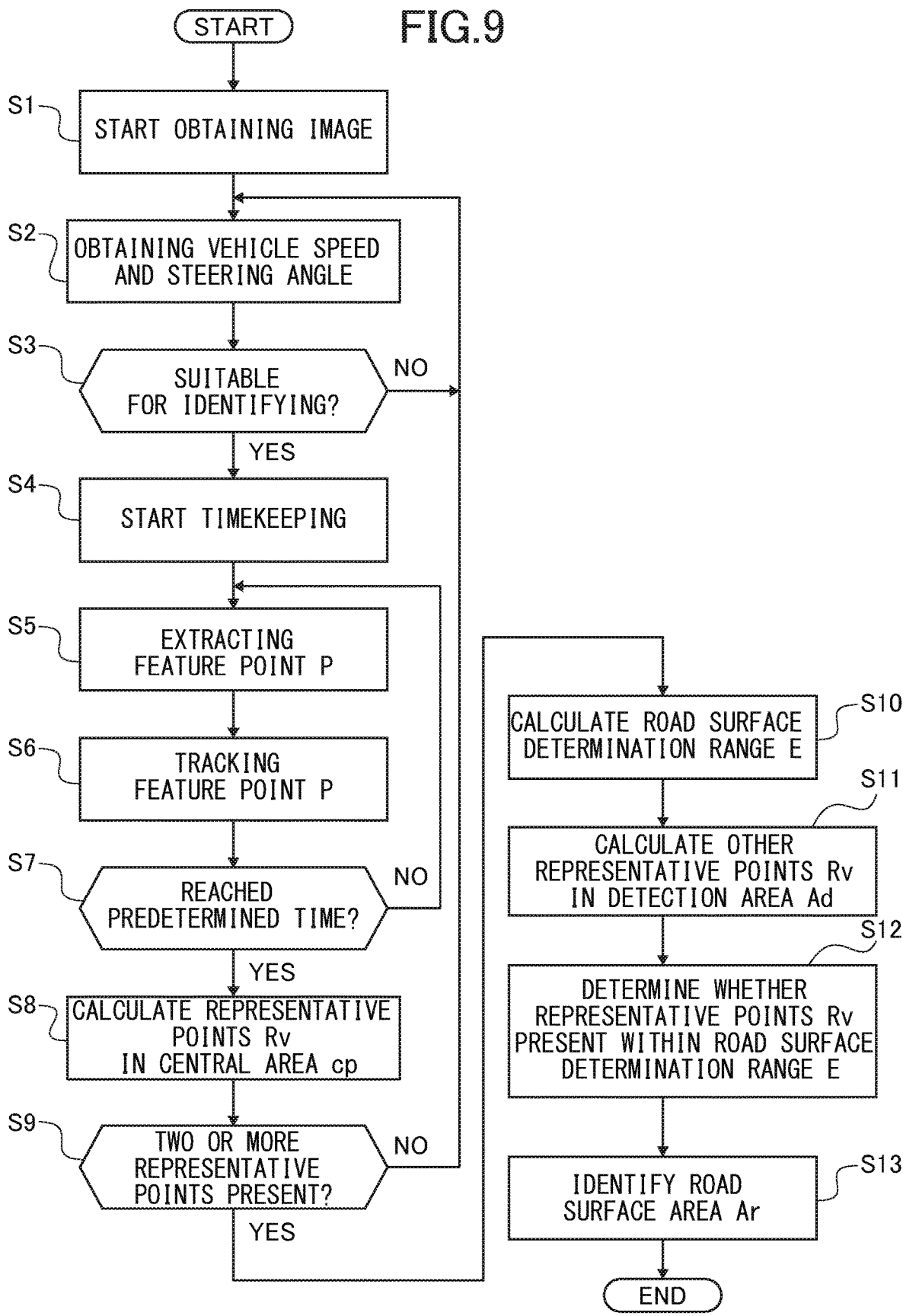
FIG. 9 is a flowchart illustrating an example of a road surface area identification process executed by a processing device.

Next, with reference to FIG. 9, an example of a road surface identification process where the road surface area Ar is identified under the control of the processing device 11 in the road surface area detection device 10 will be described. FIG. 9 is a flowchart illustrating the road surface identification process (road surface identifying method) executed by the processing device 11 according to the first embodiment. The processing device 11 executes the road surface identification process based on the program stored in the storage device 12. Hereinafter, steps (processes) the flowchart shown in FIG. 9 will be described. The flowchart shown in FIG. 9 is started when the road surface area detection device 10 is set to a state to execute the road surface identification process. The road surface area detection device 10 may be always in the state to execute the road surface identification process or may be switchable to execute the process by an operation to an operation portion. In the first embodiment, when the vehicle 1 is started, the road surface area specifying process gets ready to be executed, and the flowchart of FIG. 9 is started.

In Step S1, obtaining an image (image data) from the camera 13 is started, and the process proceeds to Step S2.

In Step S2, the vehicle speed (vehicle speed data) and the steering angle (steering angle data) are obtained from the vehicle speed sensor 14 and the steering angle sensor 15, respectively and then the process proceeds to Step S3. Specifically, in Step S2, the vehicle speed and the steering angle are obtained for a predetermined time to identify changes in the vehicle speed and the steering angle, which will be described later.

In Step S3, it is determined whether the behavior of the vehicle 1 is in a condition suitable for identifying the road surface area Ar. The process proceeds to Step S4 in the case of YES (suitable), or the process returns to Step S2 in the case of NO (unsuitable). Specifically, in Step S3, the behavior determination portion 22 determines whether the behavior of the vehicle 1 is in the condition suitable for identifying the road surface area Ar in accordance with the vehicle speed and the steering angle obtained in Step S2.

In Step S4, timekeeping for an obtaining time is started and then the process proceeds to Step S5. Specifically, in Step S4, the timekeeping for the obtaining time for the extraction of the feature point P in Step S5 and for the tracking of the feature point P in Step S6, which will be described below, is started.

In Step S5, the feature point P is extracted and then the process proceeds to Step S6. Specifically, in Step S5, the feature point obtaining portion 21 extracts the feature point P (singular or plural) in the $N^{th}$ frame of the images input from the camera 13 and obtains the coordinate position of the extracted feature point P.

In Step S6, the feature point P is tracked and then the process proceeds to Step S7. Specifically, in Step S6, the position of the feature point P, which has been extracted by the feature point obtaining portion 21 in Step S5, in the $N^{th}$ frame is detected and the coordinate position of the detected feature point P is obtained. Thereafter, the feature point P is tracked (the coordinate position thereof is obtained) as much as possible.

In Step S7, it is determined whether the obtaining time has reached a predetermined time or not. The process proceeds to Step S8 in the case of YES, or the process returns to Step 5 in the case of NO. The predetermined time is set so that the number of the feature point series Ps required for identifying the road surface area Ar can be obtained. Thereby, a plurality of feature point series Ps has been obtained by when the process proceeds to Step S8. Step S4 and Step S7 are not limited to the first embodiment. The determination may be executed in Step S4 and Step S7 based on the number of the frames in which the extraction and tracking of the feature points P have been executed or based on the cumulative number of the feature point series Ps.

In Step SR, the representative points Rv in the central area cp are calculated and then the process proceeds to Step S9.

Specifically, in Step S8, the series length calculation portion 24 calculates the feature point series length Pl in the width directional sections dv (from the tenth width directional section dv to the fifteenth width directional section dv in the first embodiment) set as the central area cp. The normalized speed calculation portion 25 calculates the normalized speeds nv in accordance with the result of the calculation by the series length calculation portion 24. Then, the representative point calculation portion 26 calculates the representative points Rv in accordance with the result of the calculation by the normalized speed calculation portion 25.

In Step S9, it is determined whether the representative points Rv calculated in Step S8 are two or more. The process proceeds to Step S10 in the case of YES, or the process returns to Step S2 in the case of NO. Specifically, in Step S9, it is determined whether the representative points Rv calculated in Step S8 are two or more, that is whether the representative points Rv are calculated in two or more width directional sections dv in the central area cp. It should be noted that the determination in Step S9 is not limited to the one in the first embodiment. Step S9 is executed to enable the calculation for the road surface determination reference line Sb. Accordingly, it may be determined whether the calculated representative points Rv are three or more as long as the number of the calculated representative points Rv is equal to or less than the number of the width directional sections dv (six in the first embodiment) set as the central area cp. Further, in the first embodiment, in the case that the representative point Rv is equal to or less than one and the process returns to Step S2, the feature point series Ps obtained by repeating Step S5 to Step S7 and the representative points Rv (data) calculated in Step S8 are deleted. This is because of the following reason. Conditions of the road surface on which the vehicle 1 is traveling and surroundings of the road surface may have been already changed when returning to Step S2. Therefore, the result would be inaccurate if the feature point series Ps and the representative points Rv obtained earlier are combined with the feature point series Ps and the representative points Rv to be obtained later.

In Step S10, the road surface determination range F is calculated based on the representative points Rv in the central area cp and then the process proceeds to Step S11. Specifically, in Step S10, the approximate straight line calculation portion 27 calculates the road surface determination reference line Sb based on the representative points Rv calculated in Step S8. In accordance with the calculation result, the determination range calculation portion 28 obtains the road surface determination upper limit line Su and the road surface determination lower limit line Sl and then calculates the road surface determination range E.

In Step S11, other representative points Rv in the detection area Ad are calculated and then the process proceeds to Step S12. Specifically, in Step S11, similar to Step S8, the calculation is executed for the representative points Rv in the width directional sections dv (from a first width directional section dv to the ninth width directional section dv and from a sixteenth width directional section dv to a twenty-fourth width directional section dv in the first embodiment) in the detection area Ad other than the representative points Rv in the central area cp calculated in Step S8. It should be noted that the representative points Rv may not be separately calculated in Step S8 and Step S11, and the representative points Rv in all of the width directional sections dv may be simultaneously calculated in Step S8.

In Step S12, it is determined whether the representative points Rv in the width directional sections dv present within the road surface determination range E and then the process proceeds to Step S13. Specifically, in Step S12, the road surface area identification portion 29 determines whether the representative points Rv in the width directional sections dv calculated in Step S8 or Step S11 present within the road surface determination range E calculated in Step S10.

In Step S13, the road surface area Ar is identified in accordance with the determination in Step S12, and the road surface area identification process is terminated. Specifically, in Step S13, identification is executed for the width directional sections dv in which the representative points Rv do not present within the road surface determination range E and which are located closest to the vehicle 1 on the left and right side of the vehicle 1, that is on the left and right side of the twelfth width directional section dv and the thirteenth width directional section dv. Then, an area between the width directional sections dv adjacent inside of the identified width directional sections dv is identified as the road surface area Ar.

Accordingly, the road surface area detection device 10 can identify, as the road surface area Ar, a flat area continuous to the road surface, on which the vehicle 1 is traveling, at the same height position as the road surface while the vehicle 1 is traveling. The road surface area detection device 10 determines whether the flat area is at the same height position as the road surface to identify the road surface area. Ar by using the normalized speeds nv and by considering the fact that the moving amounts of the feature point P in the same image captured by the camera 13 with respect to the moving amount of the vehicle 1 differ between the case where the flat area is at the same height position as the road surface and the case where the flat area is not at the same height position as the road surface. Therefore, the road surface area detection device 10 can identify the road surface area Ar by using the single camera 13 without using a binocular camera, a stereo camera, a multiple-lens camera or the like.

The road surface area detection device 10 can identify the road surface area Ar when the extraction and tracking of the feature point P are possible. Accordingly, the road surface area Ar can be identified regardless of a variety of road surfaces. In addition to the road surface, the flat area continuous to the road surface at the same height as the road surface can also be identified as the road surface area Ar. On the other hand, the prior art for identifying the road surface determines whether it is the road surface or not by detecting differences in colors on the road surface. Such a prior art cannot properly identify the road surface when there are different colors on the road surface and detects only the road surface even if the flat area is continuous to the road surface at the same height as the road surface.

The road surface area detection device 10 can be used for the calibration of the camera 13 to appropriately generate the overhead image of the camera 13, for example since the road surface area detection device 10 identifies the road surface area Ar while the vehicle is traveling. This is because it may be necessary to use the feature points on the flat surface at the same height position as the road surface to accurately calibrate the camera 13. Particularly, the road surface area detection device 10 can also identify the flat surface continuous to the road surface at the same height position as the road surface and the calibration can be made using not only the road surface but also the wider road surface area Ar. Accordingly, more accurate calibration can be achieved. Also, the road surface area detection device 10 displays the detected road surface area Ar on the image displaying device 16 by superimposing it on the overhead image so that a passenger (a driver) can recognize the road surface area Ar.

With the road surface area detection device 10 of the first embodiment which is an example of the road surface area detection device according to the present disclosure, the following effects can be achieved.

When the normalized speeds nv calculated based on the movement of the feature point P in the image captured by the camera 13 present within the road surface determination range E obtained based on the normalized speeds nv in the central area cp, the road surface area detection device 10 identifies the width directions Dw including the feature points P having the normalized speeds nv as the road surface area Ar. Therefore, the road surface area detection device 10 identifies the width directions Dw as the road surface area Ar by the single camera 13 since the road surface area detection device 10 utilizes the fact that the moving amounts of the feature point P differ even in the same image between the case where the flat area is at the same height position as the road surface and the case where the flat area is not at the same height position as the road surface. In addition, the road surface area detection device 10 identifies the road surface determination range E based on the normalized speeds nv in the central area cp where the white lines or the road signs on the road which are extracted as the feature points P are more likely present. Thereby, the road surface determination range E can be accurately calculated and accordingly the road surface area Ar can be appropriately identified. The central area cp includes the road surface on which the vehicle 1 is traveling and accordingly, the location at the same height position as the road surface can be appropriately identified.

Further, the road surface area detection device 10 identifies, as the road surface area Ar, the width directional sections dv located closer to the vehicle 1 than the feature point P located closest to the vehicle 1 in the width direction Dw among the feature points P whose normalized speeds nv present outside the road surface determination range E. Thereby, the road surface area detection device 10 can also identify the flat surface continuous to the road surface at the same height position as the road surface area Ar.

Further, in the distribution graph where the horizontal axis represents the distance of the width direction Dw and the vertical axis represents the magnitude of the normalized speed, the road surface area detection device 10 sets the approximate straight line connecting the normalized speeds nv of at least two feature points P located at the different positions in the width directions Dw as the road surface determination reference line Sb, and sets, as the road surface determination range E, an area defined between the road surface determination upper limit line Su and the road surface determination lower limit line Sl which are calculated based on the road surface determination reference line Sb. Thereby, the road surface area detection device 10 can properly detect the location at the same height position as the road surface with a simple configuration.

When the plurality of feature points P are present at the same position in the width direction Dw, the road surface area detection device 10 plots the average of the respective normalized speeds nv of the feature points P in the distribution graph as a representative point Rv of the normalized speeds nv at the same position in the width direction Dw to obtain the approximate straight line and the road surface determination reference line Sb. Thereby, the road surface area detection device 10 can identify the road surface area Ar by reducing the influence of an error generated upon extracting the feature point P and the like.

The road surface area detection device 10 divides the detection area Ad including the road surface area Ar to be identified in the width direction Dw into the plurality of width directional sections dv, each having a predetermined size. Further, The road surface area detection device 10 calculates the normalized speed nv for each of the width directional sections dv, and identifies the road surface area Ar in units of the width directional sections dv. Thereby, the road surface area detection device 10 can obtain the representative point Rv as the normalized speed nv for each of the width directional sections dv. Accordingly, the road surface area detection device 10 can identify the road surface area Ar by reducing the influence of an error generated upon extracting the feature point P and the like.

The road surface area detection device 10 sets, as the road surface determination reference line Sb, the approximate straight line connecting the normalized speeds nv of at least two feature points P in the different width directional sections dv in the predetermined central area cp of the detection area Ad where the vehicle 1 is positioned in the center thereof. Then, the road surface area detection device 10 sets, as the road surface determination range E, the area defined between the road surface determination upper limit line Su and the road surface determination lower limit line Sl which are calculated based on the road surface determination reference line Sb. Thereby, the road surface area detection device 10 can identify the road surface area Ar by reducing the influence of an error generated upon extracting the feature point P and the like.

The road surface area detection device 10 calculates the normalized speed nv by dividing the moving amount of the feature point P by the moving amount of the vehicle 1 while the feature point P is being moving or displaced. Thereby, the road surface area detection device 10 can compare differences in the movement amounts of the feature point P with the simple configuration to identify the road surface area Ar.

Consequently, the road surface area detection device 10 according to the first embodiment which is an example of the road surface area detection device according to the present disclosure can detect the road surface area Ar with the simple configuration which does not require a binocular camera, a stereo camera, a multiple-lens camera or the like.

The road surface area detection device according to the present disclosure has been described with reference to the first embodiment. However, the specific configuration is not limited to the first embodiment, and additions and/or changes of the designs are allowed without departing from the gist of inventions recited in the claims.

For example, in the first embodiment, the normalized speed nv and the representative point Rv are calculated for each of the width directional sections dv which are defined by dividing the detection area Ad in the width direction Dw and each of which has a predetermined size. In addition, the road surface area Ar is identified for each of the width directional sections dv. However, the identification of the road surface area Ar is not limited to the one in the first embodiment. The road surface area Ar may be identified by using the normalized speeds nv and the representative points Rv without setting the width directional sections dv.

Further, in the first embodiment, when the plurality of feature points P is present in the same position of the width direction Dw, the normalized speeds nvα are obtained by excluding numerical values that is significantly different from the standard deviation σ1 and the average av1 of the normalized speeds nv, and the average av2 of the normalized speeds nvα is set as the representative point Rv in the width direction Dw. However, the setting of the representative point Rv is not limited to the first embodiment. The average av1 of the normalized speeds nv may be set as the representative point Rv in the width direction Dw, or the average may be obtained by another method to be set as the representative point Rv.

Moreover, in the first embodiment, the behavior determination portion 22 determines whether the behavior of the vehicle 1 is in a condition suitable for the identification of the road surface area Ar based on the vehicle speed and the steering angle. However, the condition suitable for the identification may be determined based on a change in the inclination of the road surface on which the vehicle 1 is traveling. For example, the appearance of the road surface changes between a case where the road surface in the image captured by the camera 13 is inclined relative to the road surface on which the vehicle 1 is traveling and the case where the road surface in the image is not inclined relative to the road surface on which the vehicle 1 is traveling. Accordingly, it is difficult to track the feature point P in the image captured by the camera 13 when the inclination of the road surface changes in the middle of the traveling. Therefore, by using determination whether the change in the inclination of the road surface is within a predetermined range for the determination of the condition suitable for the identification of the road surface area Ar, the feature point P can be more accurately tracked and the road surface area Ar can be more properly identified. The feature point obtaining portion 21 in the road surface area detection device 10 may track the feature point P by considering the inclination of the road surface with an inclination sensor for detecting changes in the inclination of the road surface to track the feature point P more appropriately.

The invention claimed is:

1. A road surface area detection device comprising:
at least one processor configured to:
calculate a normalized speed by dividing an amount of movement of a feature point in a plurality of images by an amount of movement of a vehicle while the feature point is moving relative to the vehicle, the plurality of images being captured by a camera disposed in the vehicle;
calculate a road surface determination range indicated by a magnitude of the normalized speed based on normalized speeds of at least two feature points at different positions in a vehicle width direction in a predetermined central area where the vehicle is positioned in a center thereof in the vehicle width direction; and
identify, as a road surface area on which the vehicle travels, a position in the vehicle width direction that includes the at least two feature points whose normalized speed is within the road surface determination range.

2. The road surface area detection device according to claim 1, wherein the at least one processor is configured to identify, as the road surface area, a position in the vehicle width direction closer to the vehicle than the feature point located closest to the vehicle in the vehicle width direction among the feature points having normalized speeds outside the road surface determination range.

3. The road surface area detection device according to claim 1, further comprising a distribution graph in which the road surface determination range is set,
wherein the distribution graph includes horizontal axis representing a distance in the vehicle width direction, a vertical axis representing a magnitude of the normalized speed, and an approximately straight road surface determination reference line connecting the normalized speeds of the at least two feature points located at different positions in the vehicle width direction, and
wherein the road surface determination range is set in an area defined between a road surface determination upper limit line and a road surface determination lower limit line calculated based on the road surface determination reference line.

4. The road surface area detection device according to claim 3, wherein the at least one processor is further configured to, when a plurality of feature points is present in same positions in the vehicle width direction, plot averages of normalized speeds of the plurality of feature points in the distribution graph as representative points of the normalized speeds at the same positions in the vehicle width direction to obtain the road surface determination reference line.

5. The road surface area detection device according to claim 1,
wherein a detection area including the road surface area to be identified is divided in the vehicle width direction into a plurality of width directional sections, each having a predetermined size,
wherein the at least one processor is further configured to:
calculate the normalized speed for each of the plurality of width directional sections, and
identify the road surface area in terms of the plurality of width directional sections.

6. The road surface area detection device according to claim 5,
wherein an approximate straight line connecting the normalized speeds of at least two feature points in the different width directional sections in the central area of the detection area is set as a road surface determination reference line, and
wherein the road surface determination range is set in an area defined between a road surface determination upper limit line and a road surface determination lower limit line that are calculated based on the road surface determination reference line.

* * * * *